United States Patent
Moss et al.

(10) Patent No.: US 8,191,529 B2
(45) Date of Patent: Jun. 5, 2012

(54) METHOD OF MANUFACTURING AN ENGINE BLOCK

(75) Inventors: Jarrod D. Moss, Washington, IL (US);
Adam Ostein, Chillicothe, IL (US);
Curtis Graham, Peoria, IL (US);
Robert Sharp, Corinth, MS (US); Mike D. Bridges, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 1006 days.

(21) Appl. No.: 12/217,462

(22) Filed: Jul. 3, 2008

(65) Prior Publication Data
US 2010/0000090 A1 Jan. 7, 2010

(51) Int. Cl.
*F02B 75/22* (2006.01)
(52) U.S. Cl. .................. 123/195 R; 123/193.3; 277/591
(58) Field of Classification Search ............... 123/41.72, 123/41.79, 41.82 R, 193.1–193.6, 195 R; 29/401.1, 402.01, 402.06, 888.01, 888.011, 29/888.06, 888.061; 277/591–595
See application file for complete search history.

(56) References Cited

U.S. PATENT DOCUMENTS

| | | | |
|---|---|---|---|
| 1,842,441 A | 11/1929 | Yount | |
| 1,989,695 A | 7/1933 | Jensen | |
| 2,361,106 A | 11/1940 | Jensen | |
| 2,710,602 A * | 6/1955 | Maybach | 123/41.76 |
| 2,912,562 A | 4/1957 | Donovan | |
| 3,066,400 A | 2/1959 | Forsythe | |
| 3,156,224 A * | 11/1964 | Winkler | 123/41.83 |
| 3,830,209 A | 8/1974 | Jones, Jr. et al. | |
| 4,049,856 A | 9/1977 | Adams | |
| 4,112,906 A | 9/1978 | Spencer | |
| 4,229,867 A | 10/1980 | Spencer | |
| 4,494,491 A * | 1/1985 | Takada et al. | 123/41.72 |
| 4,967,458 A | 11/1990 | Rosenberg et al. | |
| 5,222,295 A | 6/1993 | Dorris, Jr. | |
| 5,666,725 A | 9/1997 | Ward | |
| 5,755,028 A | 5/1998 | Takami et al. | |
| 6,212,750 B1 | 4/2001 | Reed | |
| 2001/0024018 A1 * | 9/2001 | Teranishi et al. | 277/594 |

* cited by examiner

*Primary Examiner* — Noah Kamen
*Assistant Examiner* — Hung Q Nguyen
(74) *Attorney, Agent, or Firm* — Liell & McNeil

(57) ABSTRACT

A method for manufacturing an engine block, such as for an internal combustion engine, includes a step of removing material from a top deck of the engine block surrounding a cylinder bore to create a first removal area. Material is also removed from the top deck of the engine block surrounding at least one fluid passage to create a second removal area. An insert is positioned within a recessed area defined by the first removal area and the second removal area.

14 Claims, 5 Drawing Sheets

METHOD OF MANUFACTURING AN ENGINE BLOCK

TECHNICAL FIELD

The present disclosure relates generally to a method of manufacturing an engine block. More particularly, the present disclosure relates to removing engine block material surrounding a cylinder bore and adjacent fluid passages to create a recessed area, and positioning an insert within the recessed area.

BACKGROUND

Many components of an internal combustion engine are subject to high loads and wear during operation of the engine. One such component, for example, is the engine block, which may experience loads from combustion events occurring within combustion chambers formed by the cylinder head, pistons, and cylinder bores of the engine block. These events may subject the engine block to high loads and stresses, including thermal stresses and mechanical stresses, which may be transmitted to the engine block at, among other locations, the cylinder head, which is mounted to a top deck of the engine block, and the cylinder bores. As a result of these stresses, small cracks may form, or general wear may occur, within the engine block, particularly within or near the cylinder bores at the top deck of the engine block. In addition, wear and erosion may occur along edges of fluid passages surrounding the cylinder bores and opening through the top deck.

U.S. Pat. No. 5,222,295 teaches a method for repairing diesel engine cylinder blocks. Specifically, the cited reference teaches a method for removing selected portions along the longitudinal axis of a cylinder bore of the engine block, and installing inserts within the cavities formed within the cylinder bore. Although the described method may adequately repair cracks occurring within the cylinder bore, the reference does not contemplate cracks that may radiate from the cylinder bore and across the top deck of the engine block, or that may occur along edges of the surrounding water passages. Additionally, there remains a continuing need for methods of engine block repair and remanufacture that are effective and economically feasible.

The present disclosure is directed to one or more of the problems set forth above.

SUMMARY OF THE DISCLOSURE

In one aspect, a method for manufacturing an engine block includes a step of removing material from a top deck of the engine block surrounding a cylinder bore to create a first removal area. Material is also removed from the top deck of the engine block surrounding at least one fluid passage to create a second removal area. An insert is positioned within a recessed area defined by the first removal area and the second removal area.

In another aspect, an engine block for an internal combustion engine includes a top deck. At least one cylinder bore is formed within the engine block and opens through the top deck. At least one fluid passage is also formed within the engine block and opens through the top deck. An insert is positioned within a recessed area, surrounding both the cylinder bore and the fluid passage, of the top deck.

In yet another aspect, an insert for an engine block includes a ring-shaped body having an inner diameter matching a diameter of a cylinder bore of an engine block. A plurality of arcuate segments extend radially from an outer edge of the ring-shaped body. Each of the arcuate segments includes an opening therethrough having a diameter matching a diameter of a fluid passage of the engine block.

DETAILED DESCRIPTION

Figure 1:
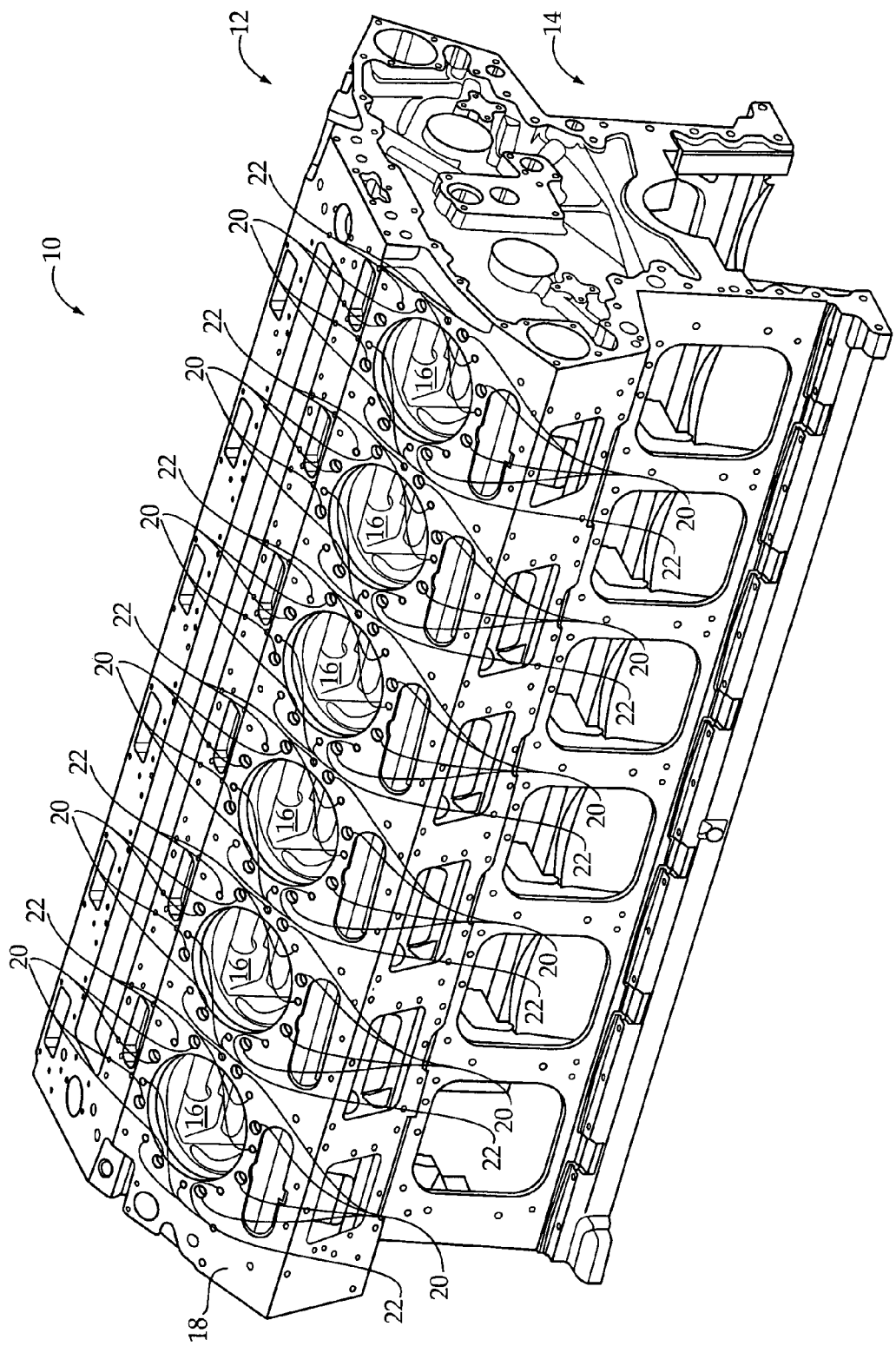
FIG. 1 is a perspective view of an engine block, according to the present disclosure.

An exemplary embodiment of an engine block 10, also referred to as a cylinder block, is shown generally in FIG. 1. The engine block 10 may, for example, be constructed of cast iron or, alternatively, aluminum or magnesium, or any other desirable material, and may include one or more cylindrically bored holes for receiving pistons of an internal combustion engine, such as a compression ignition engine or a spark-ignited engine. It should be appreciated that such an internal combustion engine, which includes engine block 10, may be used to power an on-highway or off-highway machine, stationary equipment, or any other known machine or vehicle.

The engine block 10 may be a one-piece casting and may generally include an upper section 12 and a lower section 14. The upper section 12 may include a plurality of cylinder bores 16 formed within the engine block 10 and opening through a top deck 18 of the engine block 10. Although six cylinder bores 16 are shown, it should be appreciated that the engine block 10 may include any number of cylinder bores 16, each of which may or may not include a cylinder liner. A cylinder head (not shown) may be attached to the engine block 10, such as, for example, by using a plurality of attachment bolts that may be threadably received within a corresponding number of attachment bores 20. The cylinder head, as is known in the art, may seal each of the cylinder bores 16, thus creating combustion chambers therein, and may provide a structure for supporting intake and exhaust valves and/or ports, fuel injectors, necessary linkages, and/or other known devices or structures.

The upper section 12 of the engine block 10 may also include a plurality of fluid passages 22, such as water passages, circumferentially spaced about each cylinder bore 16. Although eight fluid passages 22 are shown, it should be appreciated that any number of fluid passages 22 may be provided throughout the engine block 10. Each fluid passage 22 may be formed within the engine block 10 and may open through the top deck 18, as shown. It should be appreciated that the fluid passages 22, and additional fluid passages and/or chambers within the engine block 10, may form a water jacket or other similar cooling system for controlling circulation of a coolant and providing proper cooling of the engine block 10. It should also be appreciated that the fluid passages 22, which may include ferrule type coolant directors, and/or the water jacket may be configured to provide cooling of the cylinder head, or components thereof, attached to the engine block 10.

The lower section 14 of the engine block 10 may also include and/or define a portion of the water jacket described above. The lower section 14 may be of conventional form, and may include a crankcase, in which a crankshaft rotates. The lower section 14 of the engine block 10, as well as the cylinder head and the internal combustion engine, in general, are not within the scope of the present disclosure and, therefore, will not be described herein in greater detail. It should be appreciated, however, that the engine block 10, including features described herein, is contemplated for use with any type and/or configuration of internal combustion engine.

Figure 2:
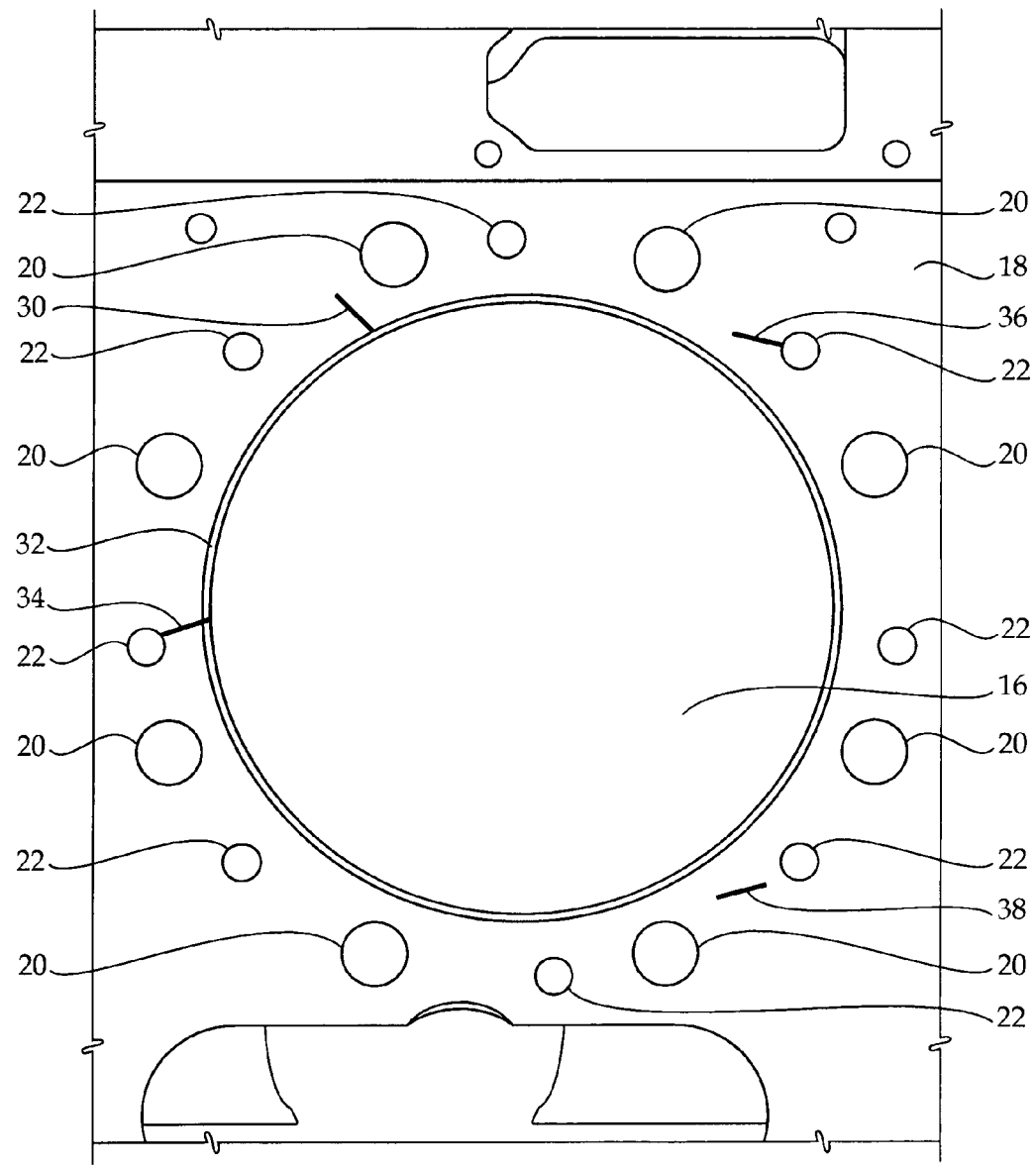
FIG. 2 is a plan view of a top deck of the engine block of FIG. 1, depicting exemplary cracks that may form near a cylinder bore and adjacent fluid passages.

Turning now to FIG. 2, a portion of the top deck 18 of the engine block 10 is shown. Particularly, one of cylinder bores 16 and adjacent, or surrounding, fluid passages 22 are shown, along with cracks that may occur within the top deck 18. Specifically, during operation of an internal combustion engine that includes engine block 10, or even during the original manufacture thereof, one or more cracks may form within the top deck 18 of the engine block 10, as should be appreciated by those skilled in the art. For example, a crack 30 may form within the cylinder bore 16, shown with a cylinder liner 32 disposed therein, and may radiate therefrom along the top deck 18 of the engine block 10. According to one embodiment, such a crack may extend to one of the fluid passages 22, as shown at 34. Similarly, a crack 36 may form within one of the fluid passages 22 and may extend therefrom across the top deck 18 of the engine block 10. Wear or erosion may also occur at edges of the fluid passages 22 along the top deck 18. Additional cracks, such as crack 38, and/or wear may occur within the top deck 18 of the engine block 10, as should be appreciated by those skilled in the art.

Figure 3:
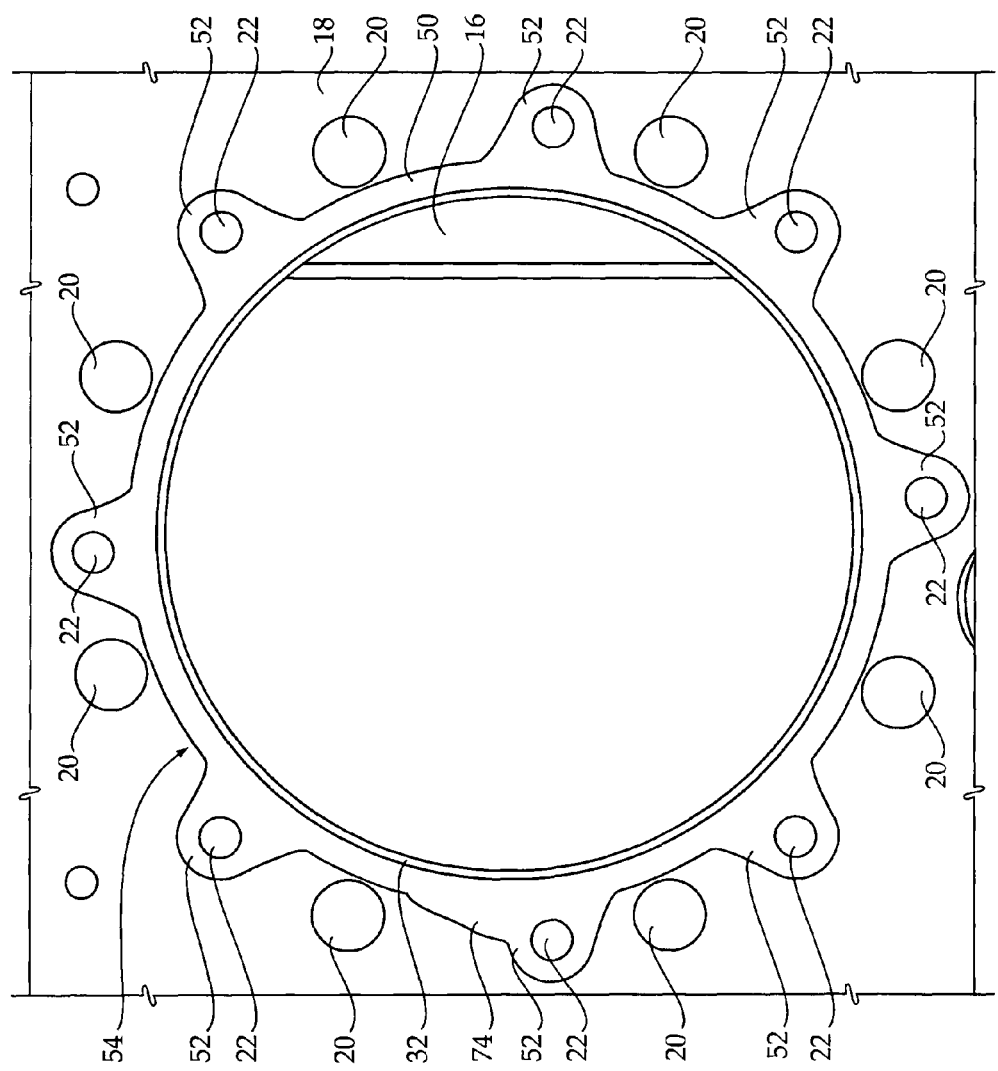
FIG. 3 is an additional plan view of the top deck, depicting a recessed area surrounding the cylinder bore and adjacent fluid passages.

During a manufacturing process of the engine block 10, material from the top deck 18 of the engine block 10 may be removed. As used herein, "manufacturing" may refer broadly to the original manufacture, remanufacture, repair, or other similar process associated with the engine block 10. Specifically, engine block material, which may include one or more of the cracks 30, 34, 36, and 38 shown in FIG. 2, may be removed from the engine block 10. According to one embodiment, engine block material surrounding the cylinder bore 16 may be removed to create a first removal area 50, as shown in FIG. 3. In addition, engine block material may be removed from the top deck 18 of the engine block 10 surrounding at least one of the fluid passages 22 to create a second removal area 52. Preferably, and as shown in the referenced Figure, engine block material may be removed from the top deck 18 surrounding each of the plurality of fluid passages 22, resulting in a corresponding number of second removal areas 52.

Material may be removed from the top deck 18 of the engine block 10 using any known machining process, such as, for example, milling or grinding, to create the first and second removal areas 50 and 52. Further, the first and second removal areas 50 and 52 may be created using a manual and/or automatic process. According to one embodiment, for example, a machining tool used to remove material from the engine block 10 may be operated via computer numerical control (CNC). However, any useful tool for removing engine block material according to precise specifications is contemplated.

A recessed area 54, as shown in FIG. 3, may be defined by the first removal area 50 and the plurality of second removal areas 52. The recessed area 54, as should be appreciated, may include a predetermined depth sufficient to machine out cracks and/or defects within the engine block 10, such as cracks 30, 34, 36, and 38, described with reference to FIG. 2. The recessed area 54 may also extend radially from each of the cylinder bore 16, or cylinder liner 32, and the fluid passages 22 an amount sufficient to remove most cracks or defects, without interfering with attachment bores 20, other passages or chambers of the water jacket, or the like. It should be appreciated that the specific dimensions for the recessed area 54 may vary, depending on the configuration of the engine block 10, and/or the repairs being performed.

Figure 4:
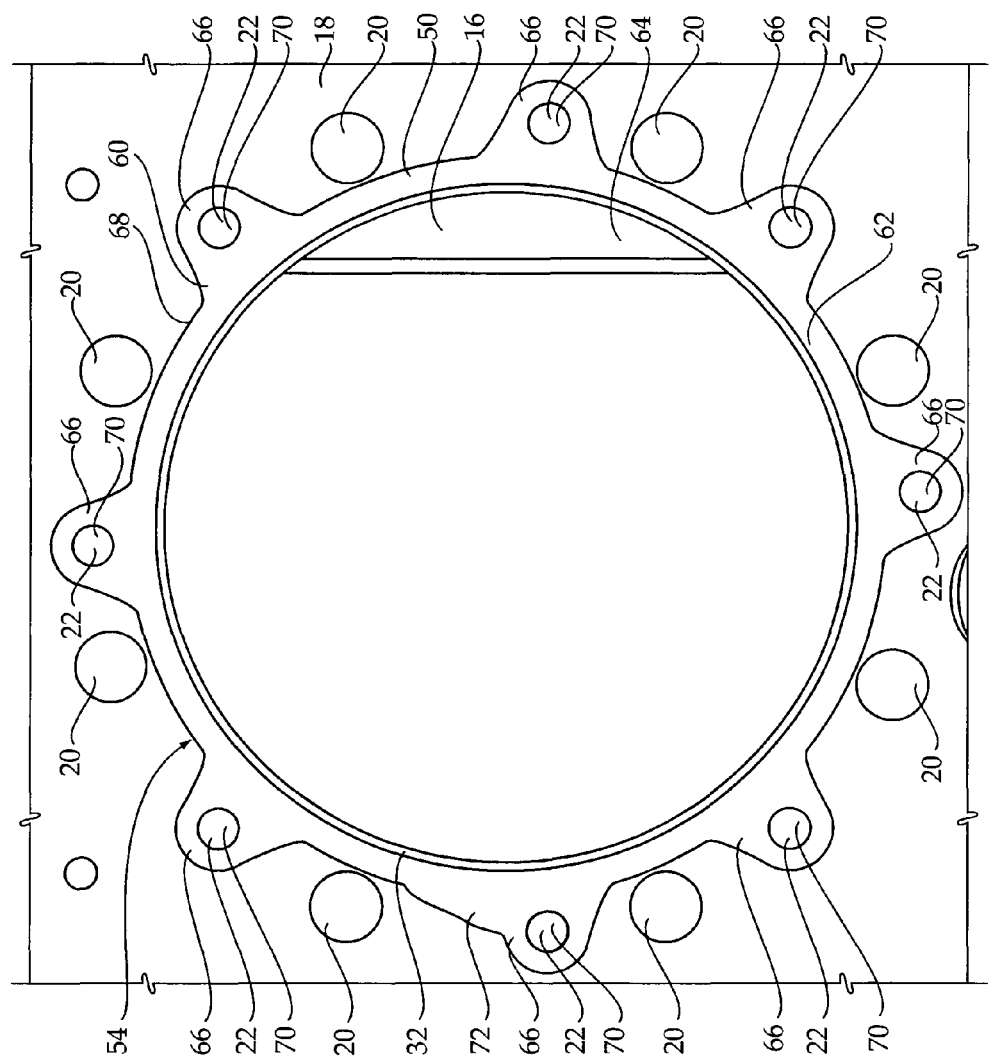
FIG. 4 is an additional plan view of the top deck, depicting an insert positioned within the recessed area of FIG. 3.
Figure 5:
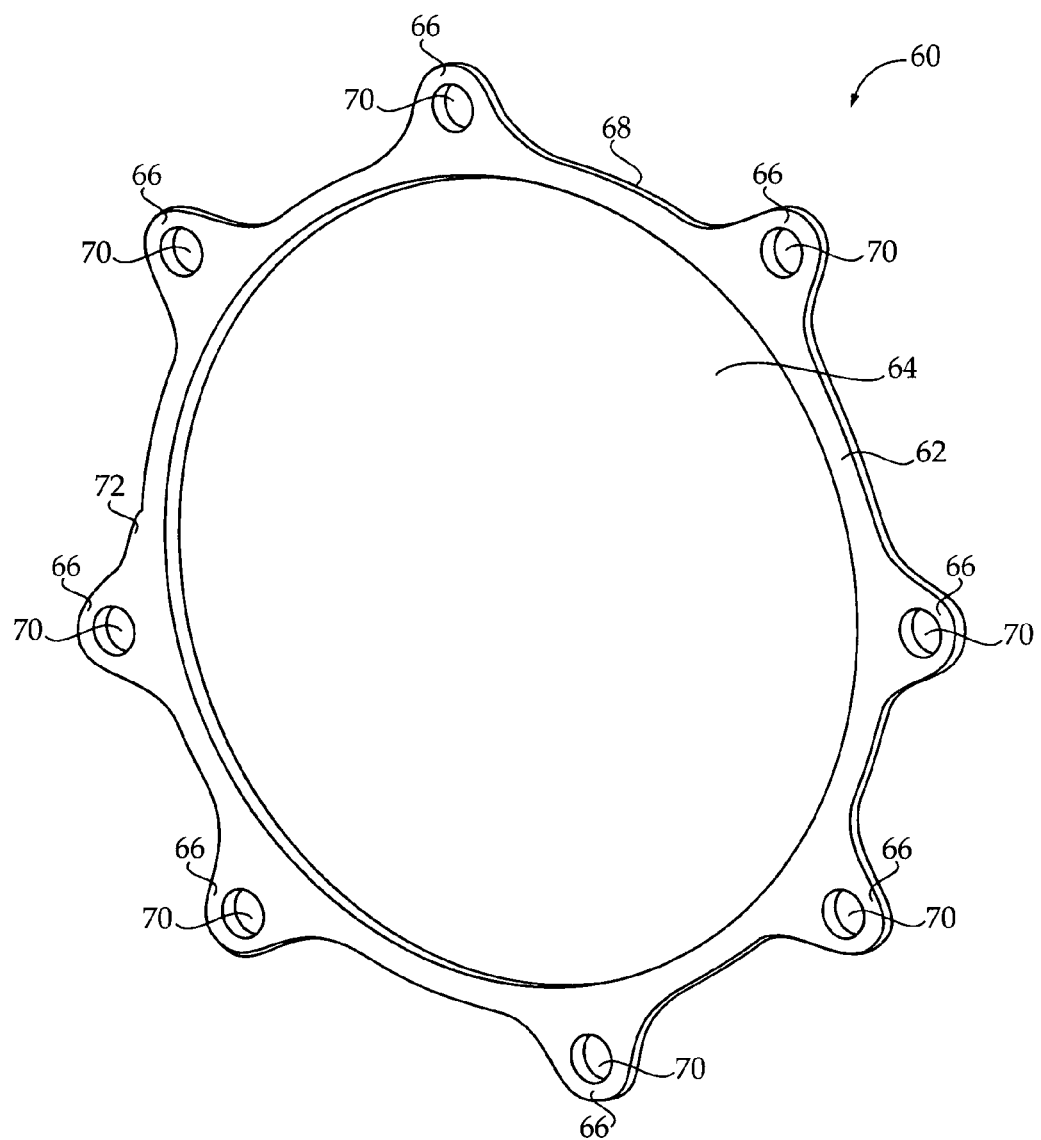
FIG. 5 is a perspective view of the insert of FIG. 4.

Turning now to FIG. 4, an insert 60 is shown positioned within the recessed area 54. The insert 60, also shown in FIG. 5, may generally include a ring-shaped body 62 having a central opening 64 matching, or aligned with, the cylinder bore 16. The insert 60 may also include a plurality of arcuate segments 66 extending radially from an outer edge 68 of the ring-shaped body 62. Each of the plurality of arcuate segments 66 may include an opening 70 matching, or aligned with, a corresponding one of the plurality of fluid passages 22. It should be appreciated that "matching," as used herein, may generally refer to openings that are substantially aligned or, at least, partially overlapping. It should be also appreciated that the insert 60 may be retained within the recessed area 54 using any known retention means, including, according to one embodiment, an interference fit. Specifically, the insert 60 may be machined, such as using a CNC process, to include dimensions slightly larger than dimensions of the recessed area 54, such that the insert 60 may be press fit within the corresponding portion of the top deck 18.

According to a specific embodiment, the ring-shaped body 62 may include eight radially extending arcuate segments 66, corresponding to eight fluid passages 22 of the engine block 10. The eight radially extending arcuate segments 66 may be unevenly spaced about a circumference of the insert 60. It should be appreciated, however, that the insert 60 may include any number of arcuate segments 66 that may or may not be evenly spaced about the circumference of the insert 60, depending on the specific configuration of the engine block 10. According to the exemplary embodiment, the insert 60 may also include a keyed feature 72 positioned along the outer edge 68 of the ring-shaped body 62. The keyed feature 72, depicted as a protrusion extending radially from the outer edge 68 of the ring-shaped body 62 between two of the arcuate segments 66, may be useful to properly position the insert 60 within the recessed area 54. For example, the keyed feature 72 of the insert 60 may be aligned with a complementary keyed feature 74 of the recessed area 54, shown in FIG. 3, prior to press fitting the insert 60 into the top deck 18.

The insert 60 may be made from stainless steel, or any other useful material, and may include a substantially uniform thickness. As should be appreciated, the thickness, as well as other dimensions of the insert 60, may be determined based on the dimensions of the recessed area 54. According to one embodiment, it may be desirable to provide an insert 60 having a thickness such that a top portion of the insert 60 will extend beyond a planar surface of the top deck 18. After positioning the insert 60 within the recessed area 54, a machining tool may be used to plane the surface of the top deck 18, thus removing any excess portions of the insert 60. Such a procedure may ensure a substantially planar surface of the top deck 18 after the insert 60 has been positioned within the recessed area 54.

It should be appreciated that cracks, such as cracks formed within or radiating from the recessed area 54, may occur after repair. The presently disclosed method, as described herein, may be repeated to repair such cracks. Specifically, the insert 60 may be removed, such as by creating one or more threaded bores within the insert 60 to attach a removal tool, and the additional cracks and/or wear occurring near the cylinder bore 16 and fluid passages 22 may be machined out. However, the recessed area 54, including both the first removal area 50 and second removal areas 52, may be enlarged only an amount sufficient to remove most of the cracks and/or wear, without interfering with other structures or components of the engine block 10. As such, the engine block 10 may be limited to a finite number of repairs. After the additional engine block material has been removed, an appropriately dimensioned insert 60 may be press fit within the recessed area 54.

Industrial Applicability

The present disclosure finds potential applicability to any engine block that may be subject to operational loads causing cracks and/or wear. Further, the disclosure may be specifically applicable to engine blocks having cracks radiating from cylinder bores and extending across a top deck of the engine block. Yet further, the present disclosure may be applicable to fluid passages surrounding such cylinder bores that may be subject to general wear and/or erosion. Although the disclosure describes the remanufacture, or repair, of such engine blocks, the method described herein may also be used during manufacture to reduce the occurrence of such cracks and/or wear during operation.

Turning now to FIGS. 1-5, an engine block 10, as described above, may include a plurality of cylinder bores 16 formed within the engine block 10 and opening through a top deck 18 of the engine block 10. The engine block 10 may also include a plurality of fluid passages 22, such as water passages, circumferentially spaced about each cylinder bore 16. Each fluid passage 22 may be formed within the engine block 10 and may open through the top deck 18, as shown in FIG. 1. The engine block 10 may also include a water jacket, or other suitable chamber, at least partially surrounding the cylinder bores 16, and other useful components known in the art.

During remanufacture, or repair, the engine block 10 may be inspected for cracks, such as by visual inspection or using a magneflux check or other known means. Cracks, such as cracks 30, 34, 36, and 38, may be discovered during the inspection. Additionally, one or more of the fluid passages 22 may exhibit wear and/or erosion around the openings thereof, along the top deck 18 of the engine block 10. To repair the engine block 10, material from the top deck 18 of the engine block 10 surrounding the cylinder bore 16 may be removed to create a first removal area 50, as shown in FIG. 3. Material may also be removed from the top deck 18 of the engine block 10 surrounding at least one fluid passage 22, and preferably a plurality of fluid passages 22, to create one or more second removal areas 52. The first removal area 50 and the one or more second removal areas 52 may define a recessed area 54.

An insert 60 may be press fit, or otherwise positioned, within the recessed area 54. As such, the insert 60 may be properly dimensioned, such as by using a CNC machining process, to fit within the recessed area 54. According to the exemplary embodiment, the insert 60 may include a substantially ring-shaped body 62 having a central opening 64 matching, or aligned with, the cylinder bore 16. The insert 60 may also include a plurality of arcuate segments 66 extending radially from an outer edge 68 of the ring-shaped body 62, and including openings 70 therethrough, matching, or aligned with, a corresponding one of the plurality of fluid passages 22.

The presently disclosed method may provide an effective means for repairing cracks and/or wear occurring within an engine block, particularly at or near a cylinder bore and surrounding water passages. Alternatively, the present disclosure may be implemented during manufacture of an engine block to reduce the occurrence of such cracks and/or wear.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine block, comprising:
a top deck;
at least one cylinder bore formed within the engine block and opening through the top deck;
at least one fluid passage formed within the engine block and opening through the top deck; and
an insert positioned within a recessed area of the top deck, wherein the recessed area surrounds both the cylinder bore and the fluid passage, wherein a thickness of the insert is substantially equal to a depth of the recessed area.

2. The engine block of claim 1, further including a plurality of fluid passages circumferentially spaced about the cylinder bore.

3. The engine block of claim 2, wherein the recessed area surrounds each of the plurality of fluid passages.

4. The engine block of claim 3, wherein the insert includes a substantially ring-shaped body having a central opening aligned with the cylinder bore, and a plurality of arcuate segments extending radially from an outer edge of the ring-shaped body, wherein each of the plurality of arcuate segments includes an opening therethrough aligned with one of the plurality of fluid passages.

5. The engine block of claim 4, wherein the plurality of arcuate segments are unevenly spaced about a circumference of the insert.

6. The engine block of claim 5, wherein the insert further includes a keyed feature aligned with a complementary keyed feature of the recessed area.

7. The engine block of claim 4, wherein the insert is retained within the recessed area by an interference fit.

8. An insert for a recessed area of a top deck of an engine block, comprising:
a ring-shaped body having an inner diameter matching a diameter of a cylinder bore of the engine block, and a plurality of arcuate segments extending radially from an outer edge of the ring-shaped body, wherein each of the arcuate segments includes an opening therethrough having a diameter matching a diameter of a fluid passage of the engine block, wherein a thickness of the insert is substantially equal to a depth of the recessed area.

9. The insert of claim 8, wherein the ring-shaped body includes eight radially extending arcuate segments.

10. The insert of claim 9, wherein the eight radially extending arcuate segments are unevenly spaced about a circumference of the insert.

11. The insert of claim 10, wherein the insert includes a keyed feature positioned along the outer edge of the ring-shaped body.

12. The insert of claim 11, wherein the keyed feature includes a protrusion extending radially from the outer edge of the ring-shaped body between two of the eight radially extending arcuate segments.

13. The insert of claim 8, wherein the insert includes a substantially uniform thickness.

14. The insert of claim 8, wherein the insert is made from a stainless steel.

* * * * *